(12) United States Patent
Gupta et al.

(10) Patent No.: US 12,041,305 B2
(45) Date of Patent: Jul. 16, 2024

(54) SYSTEMS AND METHODS FOR INCREASING FIRST USER SUBSCRIPTION

(71) Applicant: Rovi Guides, Inc., San Jose, CA (US)

(72) Inventors: Vikram Makam Gupta, Karnataka (IN); Vishwas Sharadanagar Panchaksharaiah, Tiptur (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 51 days.

(21) Appl. No.: 18/070,784

(22) Filed: Nov. 29, 2022

(65) Prior Publication Data

US 2023/0209134 A1 Jun. 29, 2023

Related U.S. Application Data

(63) Continuation of application No. 17/355,678, filed on Jun. 23, 2021, now Pat. No. 11,540,013.

(51) Int. Cl.
*H04N 21/442* (2011.01)
*H04N 21/254* (2011.01)
*H04N 21/81* (2011.01)
*H04N 21/84* (2011.01)
*H04N 21/845* (2011.01)

(52) U.S. Cl.
CPC ..... *H04N 21/44226* (2020.08); *H04N 21/254* (2013.01); *H04N 21/44204* (2013.01); *H04N 21/8133* (2013.01); *H04N 21/84* (2013.01); *H04N 21/8456* (2013.01)

(58) Field of Classification Search
None
See application file for complete search history.

(56) References Cited

U.S. PATENT DOCUMENTS

| 8,920,243 | B1 | 12/2014 | Curtis et al. |
| 9,887,946 | B2 | 2/2018 | Yang et al. |
| 10,419,790 | B2 | 9/2019 | Gersten |
| 10,423,943 | B2 | 9/2019 | Wood et al. |
| 11,012,719 | B2 | 5/2021 | Mickelsen |
| 11,164,200 | B1 | 11/2021 | Curtis et al. |

(Continued)

OTHER PUBLICATIONS

U.S. Appl. No. 09/332,244, filed Jun. 11, 1999.

*Primary Examiner* — James R Marandi
(74) *Attorney, Agent, or Firm* — Haley Guiliano LLP

(57) ABSTRACT

Systems and methods are provided for generating a customized media asset to incentivize a first user to subscribe to a subscription service. A first user provides their subscription access information to a media provider. In response to receiving the subscription access information, the media provider determines whether the subscription access information is from an account subscribed for a trial period. If the account is subscribed for the trial period, the media provider presents a plurality of media assets for selection to the first user, receives a selection of a media asset available from the subscription service, generates a customized media asset based on a media asset consumption profile of the first user, wherein the customized media asset includes a segment from an additional media asset different from the selected media asset, and presents to the first user the customized media asset instead of the selected media asset.

20 Claims, 12 Drawing Sheets

(56) References Cited

U.S. PATENT DOCUMENTS

| | | |
|---|---|---|
| 2007/0157237 A1* | 7/2007 | Cordray ................ H04N 21/47 |
| | | 725/89 |
| 2008/0251575 A1 | 10/2008 | Bowling et al. |
| 2012/0054679 A1* | 3/2012 | Ma ..................... H04N 21/4826 |
| | | 715/810 |
| 2012/0101886 A1 | 4/2012 | Subramanian et al. |
| 2012/0210351 A1* | 8/2012 | Nukala .............. H04N 21/6581 |
| | | 725/35 |
| 2013/0094830 A1 | 4/2013 | Stone et al. |
| 2015/0039505 A1 | 2/2015 | Jin et al. |
| 2015/0213026 A1 | 7/2015 | Seifert et al. |
| 2015/0229991 A1* | 8/2015 | Cordray ........... H04N 21/42204 |
| | | 725/10 |
| 2015/0365729 A1* | 12/2015 | Kaya ................. H04N 21/6582 |
| | | 725/14 |
| 2016/0094875 A1 | 3/2016 | Peterson et al. |
| 2017/0264920 A1 | 9/2017 | Mickelsen |
| 2018/0192108 A1 | 7/2018 | Lyons et al. |
| 2018/0343482 A1 | 11/2018 | Loheide et al. |
| 2019/0014367 A1* | 1/2019 | Thomas ........... H04N 21/44226 |
| 2019/0019322 A1 | 1/2019 | Sankaran et al. |
| 2019/0230387 A1 | 7/2019 | Gersten |
| 2020/0272672 A1 | 8/2020 | Orlov et al. |
| 2021/0365525 A1 | 11/2021 | Halleen et al. |
| 2022/0141549 A1 | 5/2022 | Majumdar et al. |
| 2022/0417597 A1 | 12/2022 | Gupta et al. |
| 2023/0283857 A1* | 9/2023 | Schmidt ............. H04N 21/4622 |
| | | 725/39 |

\* cited by examiner

SYSTEMS AND METHODS FOR INCREASING FIRST USER SUBSCRIPTION

CROSS-REFERENCE TO RELATED APPLICATION

This application is a continuation of U.S. patent application Ser. No. 17/355,678, filed Jun. 23, 2021, the disclosure of which is incorporated in its entirety herein by reference.

BACKGROUND

This disclosure relates to systems and methods for providing media assets to a first user, and more particularly, to systems and methods for providing customized media assets to a first user in order to incentivize the first user to subscribe to a service provider offering the media asset of interest to the first user.

SUMMARY

Modern media distribution systems enable a first user to access more media content than ever before. However, given the large variety of media providers and media content available to first users of media services (e.g., cable, broadcast, satellite, over-the-top provider), it is a challenging task for subscription-based media providers to incentivize first users to subscribe to their respective services. From the first user's perspective, the number of available choices of media providers and media content can be overwhelming.

One approach taken by media providers has been to offer potential subscribers a temporary trial account during which the first users can watch a limited amount of available content. For example, first users are often provided access to one free episode of serial media content in hopes of encouraging first users to subscribe to the media provider in the event that the first users like the one free episode. However, first users typically aren't engaged with a serialized media asset after watching just one single episode. For instance, media providers often make the very first episode of a serialized media asset available for viewing during the trial period. However, the first episodes of most serialized media assets focus on establishing the program characters and narrative instead of moving the plot forward which first users are more likely to find engaging. Thus, first users with trial accounts are less likely to become permanent subscribers. In another example, when first users may have watched a few episodes of a serialized media asset and are interested in a particular plot of the serialized media asset, the available one free episode may not be sufficiently tailored to what engaged the first user initially. For instance, if the free episode available to the first user does not continue a particular plot that the first user is interested in, but instead focuses on other characters and/or plot lines, the first user will lose interest in the serialized media asset and no longer be interested in subscribing permanently to the media provider.

To overcome such deficiencies, methods and systems are described herein for providing a customized media asset during the trial period to incentivize a first user to subscribe to a subscription service instead of a selected media asset. More particularly, when a first user with a trial account selects a particular episode of a serialized media asset, systems and methods disclosed herein provide a customized media asset which includes segments of the selected episode along with segments from additional episodes of the series which are otherwise not accessible to the first user during the trial period. In one embodiment, the customized media asset is generated based on a media asset consumption profile of the first user requesting the media asset to ensure that the first user will find the available content engaging, thus increasing the likelihood of the first user becoming a permanent subscriber.

In some embodiments, the system, upon receipt of a request for a media asset, determines whether the received request is from an account subscribed for a trial period. For example, the system may query a database of registered accounts subscribed to the media provider to determine that the received request is from an account subscribed for a trial period. In response to determining that the received request is from an account subscribed for a trial period, the system retrieves a media asset consumption profile of the first user.

In some embodiments, the media asset consumption profile of the first user is based on a media asset viewing history of the first user. For example, the system may query a database of media assets previously viewed by the first user on other channels available from the media provider to which the first user is permanently subscribed to. In another example, the system may monitor the social media accounts of the first user requesting the media asset to identify media assets that the first user has shown interest in. In still another example, the system identifies other first users within the first user's social circle that are likely to have similar interests. The media asset consumption profile for the first user requesting the media asset may then include the media asset viewing history of the other first users within the first user's social circle.

The system then generates a customized media asset based on the media asset consumption profile of the first user, where the customized media asset includes a segment from an additional media asset that is not accessible to the first user during the trial period. In some embodiments, the system determines a preferred concept of the first user based on the media asset consumption profile of the first user. For example, the system may retrieve metadata for each of the media assets previously viewed by the first user and identify metadata that feature most commonly among them. For instance, the system may identify particular genres and/or actors who feature most prominently in the media asset viewing history for the first user. In another embodiment, the system monitors the first user's social media activity to identify media assets that the first user has engaged with.

In some embodiments, the first user may have previously watched a few episodes of a series before subscribing for a trial period to watch another episode. The system, in such an instance, identifies segments of the previously viewed episodes of the series that were likely of interest to the first user. For example, the system monitors the first user's social media activity to identify segments of the previously viewed media assets that the first user has engaged with on social media. In another example, the system may identify most popular segments of the previously viewed episodes by performing a sentiment analysis on the episodes. For instance, the system may review social media discussions including critical reviews of those episodes that the first user has previously viewed to identify the most popular segments that were more likely to be of interest to the first user. The media asset consumption profile of the first user incorporates these identified segments as being of high interest to the first user.

The system then generates the customized media asset based on the identified segments. More particularly, the system identifies a preferred concept (e.g., a character, genre, or a particular plot line) based on the media asset consumption profile of the first user, as discussed above. Next, the system identifies segments from additional episodes of the series that represent the identified preferred concept. For example, when the media asset consumption profile of the first user indicates that the first user has a strong engagement with a particular character, the system identifies segments (i.e., scenes) from additional episodes of the series which includes the selected media asset that feature the particular character. The system identifies these segments using retrieved metadata for the additional episodes of the series in accordance with one embodiment. In some embodiments, the system generates the customized media asset such that the customized media asset primarily includes scenes representing the preferred concept (e.g., scenes featuring the particular character of interest) from all of the episodes of the series.

In some embodiments, the customized media asset may also include brief summaries interspersed through the customized media asset to assist the first user in understanding the context of the scenes representing the preferred concept. For example, when the customized media asset focuses on scenes featuring a particular character, the customized media asset may include a precap providing a preliminary summary of the forthcoming events to aid the understanding of the scene.

In an embodiment, the customized media asset does not include segments from the last few episodes of the series in order to maintain a cliffhanger and to incentivize the first user to subscribe permanently to the media provider in order to view the conclusion. For example, when the customized media asset focuses on scenes featuring a particular character, the customized media asset may end at a critical scene for the particular character. This increases the first user's interest in the conclusion of the series as the first user is more invested in the particular character, thereby increasing the likelihood of the first user subscribing permanently to the media provider.

In an embodiment, the customized media asset is generated based on one or more of a device type, network type, or a location from which the request for the media asset was received. For example, when the first user selects the media asset, the system may determine the screen size of device on which the media asset will be viewed. The system can determine the device specifications by, for instance, reviewing the request received at a server of the media provider which includes such information (e.g., a type of web browser or application used to request the media asset).

The system then accounts for the particular device when generating the customized media asset. In one example, when the system determines that the first user is requesting the media asset for viewing on a mobile device having a small screen size, the system does not include segments in the customized media asset that are best viewed on a larger screen (e.g., battle scenes) while prioritizing segments that are less impacted by viewing on a smaller screen size. In another embodiment, the system accounts for the network type (e.g., 4G, LTE, WIFI, etc.) on which the selected media asset will be transmitted to a device on which the first user intends to view the selected media asset. For example, when the system determines that the network connection is likely to be slow and result in a lower resolution video being transmitted to the first user's device, the system generates the customized media asset to include segments which are not impacted by a lower resolution (e.g., scenes featuring a lot of dialogue with characters being stationary) and limits the segments which are significantly impacted by the lower resolution (e.g., action scenes).

The customized media asset is then generated for display in place of the selected media asset. In contrast to traditional approach of merely presenting a single free episode without any modifications, the systems and methods described herein provide a customized media asset that has been curated to include segments that are likely to be of interest to the first user and are best suited for the type of device and/or network that the first user will watch the customized media asset. In this way, the system significantly improves the first user viewing experience, thereby making it more likely that the first user will become a permanent subscriber.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure are described herein for providing customized media assets to a first user in order to increase the likelihood that the first user permanently subscribes to a media provider (i.e., subscription service) offering the media asset of interest to the first user. Free trial accounts are normally offered as a result of a user attempting to watch an episode of a show from a source that the user is not subscribed to. For example, a first user who is temporarily subscriber to the media provider is presented with a number of media assets that are available during the trial period (e.g., one free episode of the series "Game of Thrones"). When the first user selects one of available media assets, the system generates a customized media asset which includes segments from the series to which the selected media asset belongs to, where the segments are identified to be of interest to the first user. For example, when the first user selects "Game of Thrones," a customized episode of the show is generated and presented to the first user instead of presenting the first episode of the series. The customized episode is personalized to the first user's interests (e.g., based on the first user's viewing history of media assets featuring the actor "Kit Harrington") by including segments of the series "Game of Thrones" (e.g., scenes featuring the location "Winterfell") that the first user is likely to enjoy. Instead of providing only the first episode of the series which only establishes the background of the characters, the first user is provided with a customized episode which is tailored to their interests, thus increasing the likelihood that the first user is engaged with the series and becomes a permanent subscriber.

Figure 1:
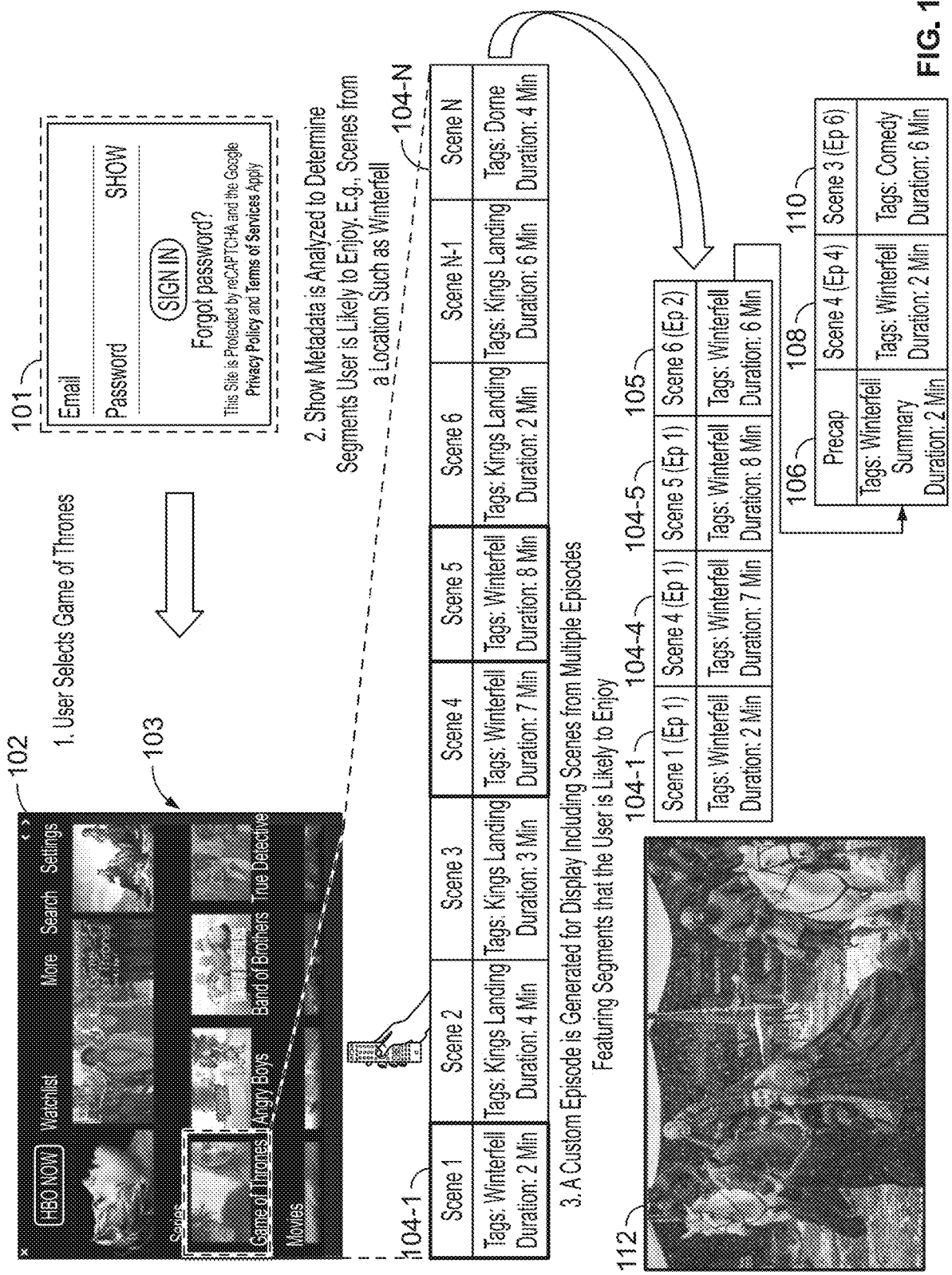
FIG. 1 shows an illustrative depiction of a system for generating a customized media asset, in accordance with some embodiments of this disclosure.

FIG. 1 shows an illustrative depiction of a system 100 for generating a customized media asset, in accordance with some embodiments of the disclosure. A first user enters their subscription access information (e.g., log in credentials such as a first username and a password) via a first user interface 101 of the media provider. Upon receiving the subscription access information, the media provider can check the received information against a database of subscriber credentials to determine whether the first user is in a trial period on a temporary subscription. When the media provider determines that the first user is in a trial period, the media provider presents a plurality of media assets available to the first user during the trial period.

Specifically, as illustrated in FIG. 1, first user equipment device 102 displays a listing of media assets 103 available to the first user during the trial period while they are a temporary subscriber. For example, during a trial period, a free episode of shows such as "Game of Thrones," "Angry Boys," and "Band of Brothers" may be made available to the first user. As discussed above, media providers conventionally make an episode of their programming free to first users with temporary subscriptions in hopes of encouraging them to become permanent subscribers. Methods and systems described herein instead generate a customized media asset for the first user. Specifically, as illustrated in FIG. 1, upon selection of the show "Game of Thrones," metadata for each of the episodes of the show are retrieved. For example, content providers supply chapter markers and other per-chapter metadata using the EXT-X-SESSION-DATA tag in a Hypertext Transfer Protocol (HTTP) Live Streaming (HLS)master playlist. In an embodiment, the media provider server receives this metadata in JavaScript Object Notation (JSON) format that uses human-readable text to define data objects.

As further illustrated in FIG. 1, each of the available media assets 103 comprises of a plurality of video segments. For example, the media asset "Game of Thrones" comprises of video segments 104-1-104-N (collectively, 104) as shown in FIG. 1. Each of the plurality of video segments 104 corresponds to a scene of the respective shows. Moreover, each video segment 104 has metadata associated with the respective scenes, including information relating to the duration of the respective scenes and one or more category and/or location tags associated with the respective scenes. For example, as illustrated in FIG. 1, video segment 104-1 comprises a first scene of the first episode of the show "Game of Thrones" and includes the geographic tag of "Winterfell" while video segment 104-N comprises a final scene of the first episode of the show "Game of Thrones" and includes the geographic tag of "Dome." Additional details with regard to the metadata associated with the respective scenes are provided in greater detail below in connection with the discussion of FIG. 3.

In addition, the media provider develops a media consumption profile of the first user. For example, the media provider obtains a list of media assets previously viewed by the first user. In one embodiment, the media provider can identify one or more social media networks to which the first user is subscribed to and monitor the first user's engagement with media assets on those networks. For example, the media provider may determine that the first user has previously shared content from the show "Game of Thrones" featuring characters from the show such as "Ned Stark," "Arya Stark," and "Jon Snow." Based on the retrieved media asset viewing and interaction history of the first user, the media provider can develop the media consumption profile for the first user. A person skilled in the art will understand that any number of methods can be used to develop the media consumption profile of the first user, some of which are discussed in greater detail below.

Once the media consumption profile for the first user is generated, the media provider generates a customized episode of the show "Game of Thrones" to present to the first user. Specifically, instead of merely presenting the first episode of the show "Game of Thrones" which only features a few scenes situated within the geographic location "Winterfell," and may not be of high interest to the first user, the media provider presents a customized episode that includes solely of scenes situated within the geographic location "Winterfell." As illustrated in FIG. 1, the media provider creates a customized media asset 112 which includes scenes 104-1, 104-4, and 104-5 from the first episode of the show "Game of Thrones." In addition, the media provider adds video segments 105, 108, 110 from future episodes of the show "Game of Thrones" where the additional video segments 105, 108, 110 also feature scenes situated within the geographic location "Winterfell" in order to cater to the interests of the first user. As further shown in the embodiment illustrated in FIG. 1, customized media asset 112 includes a video segment 106 which provides a summary of the plot to facilitate the first user's understanding of the storyline as the scenes jump across future episodes of the series. Although FIG. 1 shows one summary video segment 106, the media provider can add as many summary video segments 106 within the customized media asset 112 as needed to facilitate the first user's enjoyment and comprehension of the show "Game of Thrones."

The system generates a manifest file for the customized media asset by extracting specific segments from manifests associated with various episodes of the show. Scenes from episodes that have not aired or are available on-demand might be used based on the chosen plot or actor of interest to the first user. Currently, manifests (e.g., an HLS playlist) can contain chapter metadata in JSON format (e.g., via a Uniform Resource Identifier (URI)) that is referenced by a specific tag (e.g., EXT-X-SESSION—DATA) in the main or master playlist. Each chapter can be associated with multiple types of data—e.g., start time/duration, title(s), description, image(s), and other items. In an embodiment, media providers can provide such data to the system in order to generate the customized media asset. In some embodiments, machine learning algorithms that are based on video analysis can also generate the JSON files. The customized media asset can be generated by analyzing various JSON files associated with the various episodes. For example, the field name "start-time" associated with the plot (description) and actor can be used to identify the specific segments to reference during the media playback. In some embodiments, the description of segments of various episodes of the show can be available in multiple languages. In such an embodiment, the customized media asset can be generated in various languages as well (e.g., if there are multiple audio tracks available) based on a profile of the user.

As illustrated in FIG. 1, the customized media asset only includes scenes up to the sixth episode of the series "Game of Thrones" but does not include any scenes from the end of the series. In an embodiment, the customized media asset does not include segments from the last few episodes of the series in order to maintain a cliffhanger and to incentivize the first user to subscribe permanently to the media provider in order to view the conclusion. For example, the death of the character "Ned Stark" is a central plot in the first season of the show "Game of Thrones." By preparing the customized media asset to include scenes leading up to that event within the show but not scenes showing the conclusion of that storyline, methods and systems described herein increase the first user's interest in the conclusion of the series as the first user is more invested in the particular character, thereby increasing the likelihood of the first user subscribing permanently to the media provider.

In this manner, the system is able to present to the first user a customized media asset which matches the interests of the first user instead of merely providing the first episode of the series, which can provide an unsatisfactory viewing experience. Specifically, the presentation of the customized media asset 112 increases the likelihood that the first user finds the series "Game of Thrones" engaging and therefore become a permanent subscriber of the media provider.

Figure 2:
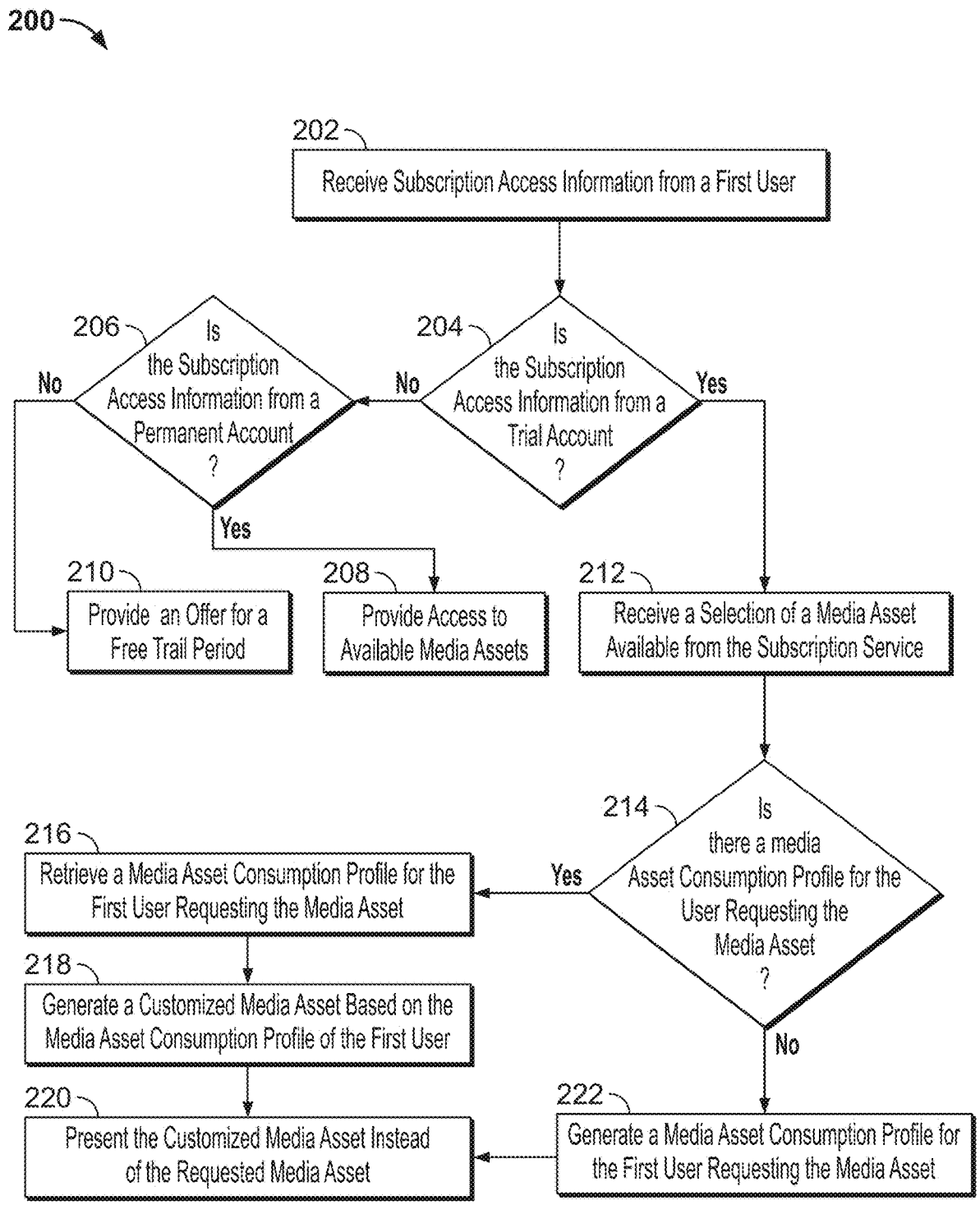
FIG. 2 is a flowchart of a detailed illustrative process for generating a customized media asset instead of a requested media asset in order to increase the likelihood of a first user becoming a permanent subscriber, in accordance with some embodiments of this disclosure.

FIG. 2 is a flowchart for representing a process 200 for generating a customized media asset based on a first user media consumption profile to incentivize the first user to subscribe to a subscription service, in accordance with some embodiments of the disclosure. Process 200 may be implemented on control circuitry 1104. At 202, control circuitry 1104 receives subscription access information from the first user. For example, the first user can enter their log in credentials (e.g., first username and password) via a first user interface of the media provider. At 204, control circuitry 1104 determines whether the received subscription access information corresponds to a trial account (i.e., an account belonging to a temporary subscriber). If at 204, control circuitry 1104 determines that the received subscription access information does not correspond to a trial account (NO at 204), process 200 proceeds to 206 and control circuitry 1104 determines whether the received subscription access information corresponds to a permanent account. If at 206, control circuitry 1104 determines that the received subscription access information corresponds to a permanent account (YES at 206), process proceeds to 208 and control circuitry 1104 provides available media assets to the first user for viewing. If, on the other hand, control circuitry 1104 determines that the received subscription access information does not correspond to a permanent account (NO at 206), process proceeds to 210 and control circuitry 1104 provides an offer for a free trial period to the first user.

If, on the other hand, control circuitry 1104 determines that the received subscription access information corresponds to a trial account (YES at 204), process 200 proceeds to 212 where a plurality of media assets are displayed for selection by the first user. At 212, control circuitry 1104 receives a selection of a media asset from the first user. For example, as illustrated in FIG. 1, the first user can select the show "Game of Thrones." In response to receiving the selection of a media asset, process 200 proceeds to 214 where control circuitry 1104 determines whether a media asset consumption profile for the first user is available.

If at 214, control circuitry 1104 determines that the media asset consumption profile for the first user is not available (NO at 214), process 200 proceeds to 222 and control circuitry 1104 develops a media asset consumption profile for the first user. For example, control circuitry 1104 obtains a list of media assets previously viewed by the first user. In one embodiment, control circuitry 1104 can identify one or more social media networks to which the first user is subscribed to and monitor the first user's engagement with media assets on those networks. For example, control circuitry 1104 may determine that the first user has previously shared content from the show "Game of Thrones" featuring characters from the show such as "Ned Stark," "Arya Stark," and "Jon Snow." Based on the retrieved media asset viewing and interaction history of the first user, control circuitry 1104 can develop the media consumption profile for the first user. Process 200 then proceeds to 218 discussed below.

If, on the other hand, control circuitry 1104 determines that the media asset consumption profile for the first user is available (YES at 214), process 200 proceeds to 216 and control circuitry 1104 retrieves the media asset consumption profile for the first user. At 218, control circuitry 1104 generates a customized media asset based on the media asset consumption profile of the first user. For example, as illustrated in FIG. 1, control circuitry 1104 creates a customized media asset 112 which includes scenes 104-1, 104-4, and 104-5 from the first episode of the show "Game of Thrones." In addition, control circuitry 1104 adds video segments 105, 108, 110 from future episodes of the show "Game of Thrones" where the additional video segments 105, 108, 110 also feature scenes situated within the geographic location "Winterfell" in order to cater to the interests of the first user. As further shown in the embodiment illustrated in FIG. 1, customized media asset 112 includes a video segment 106 which provides a summary of the plot to facilitate the first user's understanding of the storyline as the scenes jump across future episodes of the series. Finally, at 220, control circuitry 1104 presents the customized media asset instead of the requested media asset for display.

Figure 3:
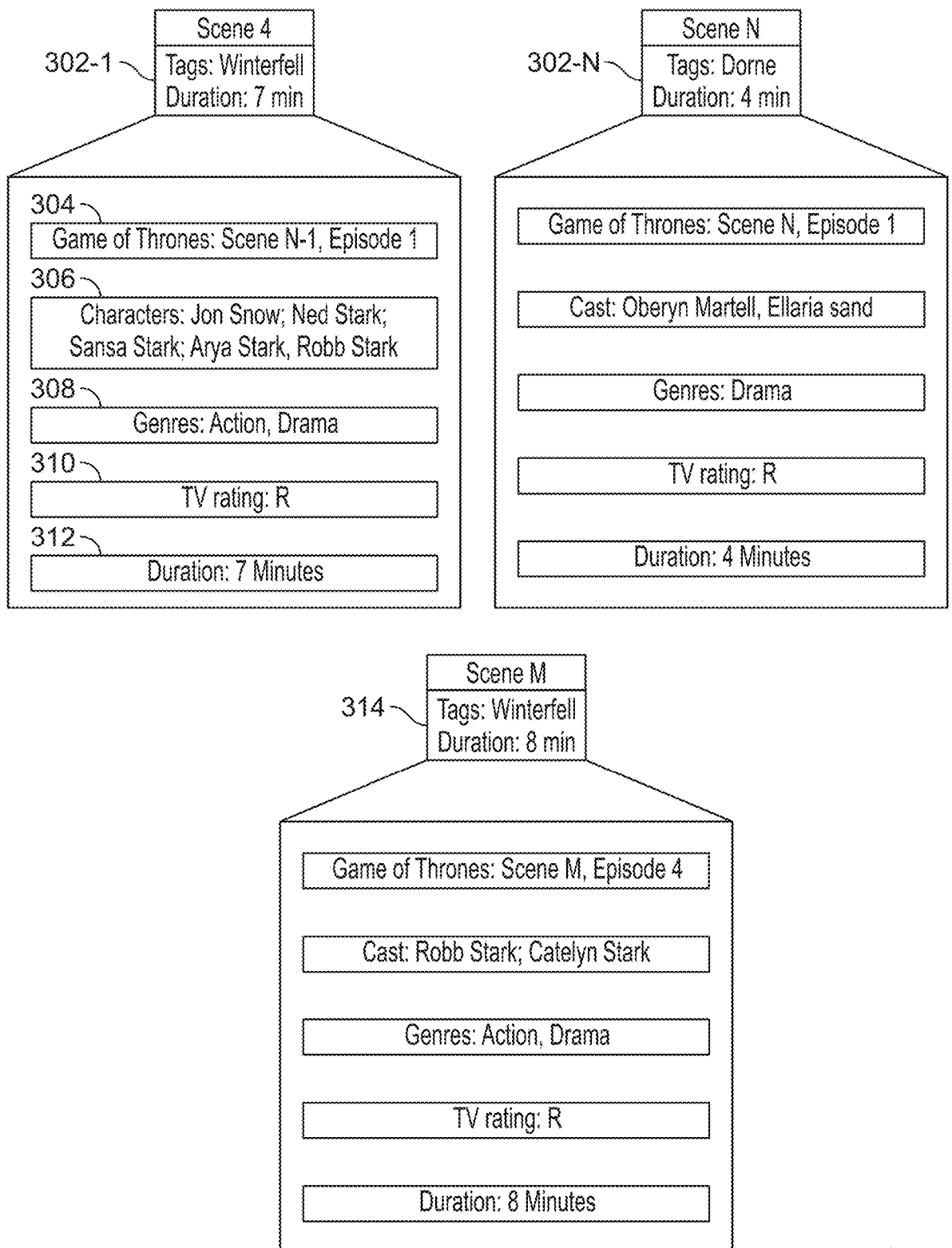
FIG. 3 shows an example of an illustrative data structure for video segment metadata, in accordance with some embodiments of the disclosure.

FIG. 3 shows an example of an illustrative data structure for video segment metadata, in accordance with some embodiments of the disclosure. Specifically, FIG. 3 shows the data structure for video segment metadata corresponding to video segments 302 of the show "Game of Thrones." As illustrated in FIG. 3, metadata related to video segment 302-1 includes title of scene 304 (e.g., Game of Thrones, scene 4), characters 306 featured in the scene (e.g., Jon Snow, Ned Stark, Sansa Stark, Arya Stark, Robb Stark), genre 308 (e.g., Action, Drama), media asset rating 312 (e.g., R rating), and duration 312 (e.g., minutes). A person skilled in the art will understand that any amount of additional metadata may be stored for each scene and that the above examples are merely for illustrative purposes. Similarly, as further illustrated in FIG. 3, metadata related to video segment 302-N and 314 includes title of scene, cast featured in the scene, genre, media asset rating, and duration. The system stores similar metadata for each video segment of each of the plurality of episodes of the show "Game of Thrones."

Figure 4:
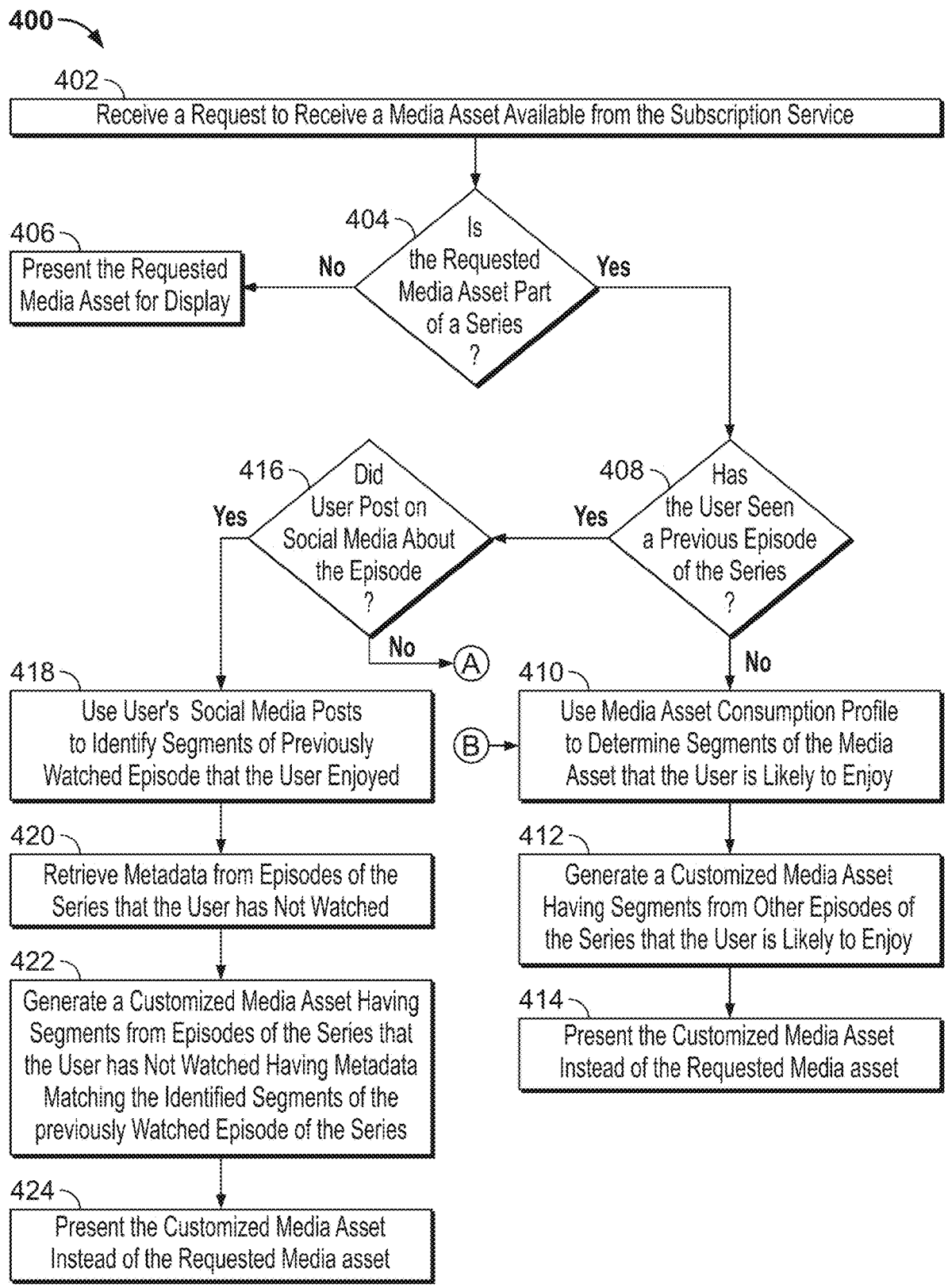
FIG. 4 is a flowchart of a detailed illustrative process for generating a customized media asset, in accordance with some embodiments of this disclosure.

FIG. 4 is a flowchart for representing a process 400 for generating a customized media asset based on a first user media consumption profile to incentivize the first user to subscribe to a subscription service, in accordance with some embodiments of the disclosure. Process 400 may be implemented on control circuitry 1104. In accordance with embodiments disclosed herein, the customized episode is generated based on the episode that the user decides to watch for free. For example, the user might have watched a portion of a show (e.g., first four episode of season one) on a different service or at a friend's house and want to "resume" watching the show and therefore select Season 1, Episode 5 of the show. The version of Season 1 Episode 5 presented to the user is different from the broadcast version or the on-demand version available to existing permanent subscribers. For example, the customized episode consists of scenes from specific future episodes that are focused on a specific character or plot from previous episodes that likely caused the user to want to continue watching. The system generates customized media assets based on a popular plot in previous episode(s) by selecting and aggregating specific scenes related to such plot from other episodes as will be described below. Similarly, the customized media asset can follow a specific actor from a previous episode(s). For example, the focus can be on a protagonist or a supporting actor.

At 402, control circuitry 1104 receives a request to receive a media asset available from the subscription service. For example, control circuitry 1104 receives a request to view the show "Game of Thrones." At 404, control circuitry 1104 determines whether the requested media asset is part of a series. If, at 404, control circuitry 1104 determines that the requested media asset is not a part of a series (NO at 404), process 400 proceeds to 406 where the requested media asset is displayed. For example, when the first user selects a movie available from the media provider, control circuitry 1104 displays the movies.

If, on the other hand, control circuitry 1104 determines that the requested media asset is part of a series (YES at 404), process 400 proceeds to 408. At 408, control circuitry 1104 determines whether the first user has seen a previous episode of the series. For example, control circuitry 1104 determines whether the first user has seen one or more previous episodes of the show "Game of Thrones." If, at 408, control circuitry 1104 determines that the first user has not previously seen an episode of the series (NO at 408), control circuitry 1104 proceeds to 410 where the media consumption profile of the first user is used to determine segments of the media asset that the first user is likely to enjoy. For example, control circuitry 1104 can analyze the media asset viewing history of the first user to identify genres, characters, etc. that are of interest to the first user based on a frequency of viewing habits of the first user. At 412, control circuitry 1104 generates a customized media asset which includes segments from all episodes of the series. More particularly, the customized media asset (e.g., media asset 112 in FIG. 1) includes video segments which are likely to be of interest to the first user (e.g., scenes featuring the actor "Kit Harrington" based on the first user viewing other movies which feature the actor of interest).

If, on the other hand, control circuitry 1104 determines that the first user has previously seen an episode of the series (YES at 408), process 400 proceeds to 416, where control circuitry 1104 determines whether the first user has previously posted on social media about the previously seen episodes. In one embodiment, control circuitry 1104 can retrieve social media activity of the first user to identify any social media engagement related to the previously seen episodes of the show "Game of Thrones." If control circuitry 1104 determines that first user has not previously posted on social media about the previously seen episodes (NO at 416), process 400 proceeds to 502, as will be described in greater detail in connection with FIG. 5.

If, on the other hand, control circuitry 1104 determines that first user has previously posted on social media about the previously seen episodes (YES at 416), process 400 proceeds to 418. At 418, control circuitry 1104 uses the social media activity of the first user to identify segments of previously watched episodes that the first user enjoyed. For example, if the first user remarked on a social media network stating, "Why would they do that to Ned Stark?!", control circuitry 1104 can determine that the first user has enjoyed that particular storyline from the first season of the show "Game of Thrones." Process 400 proceeds to 420 where metadata for each of the future episodes that the first user has not previously seen is retrieved. For example, content metadata is retrieved from the HLS master playlist, in accordance with one embodiment.

At 422, control circuitry 1104 generates a customized media asset which includes segments from episodes of the series that the first user has previously not watched. More particularly, the customized media asset includes segments having metadata that match metadata from the episodes that the first user has previously watched. For example, when control circuitry 1104 determines that the first user has shown interest in the storyline featuring the character "Ned Stark," scenes from additional episodes of the show "Game of Thrones" that continue the storyline of the character "Ned Stark" are retrieved to generate the customized media asset. At 424, the customized media asset 112 is presented to the first user instead of the requested media asset (e.g., a first episode of the series "Game of Thrones").

Figure 5:
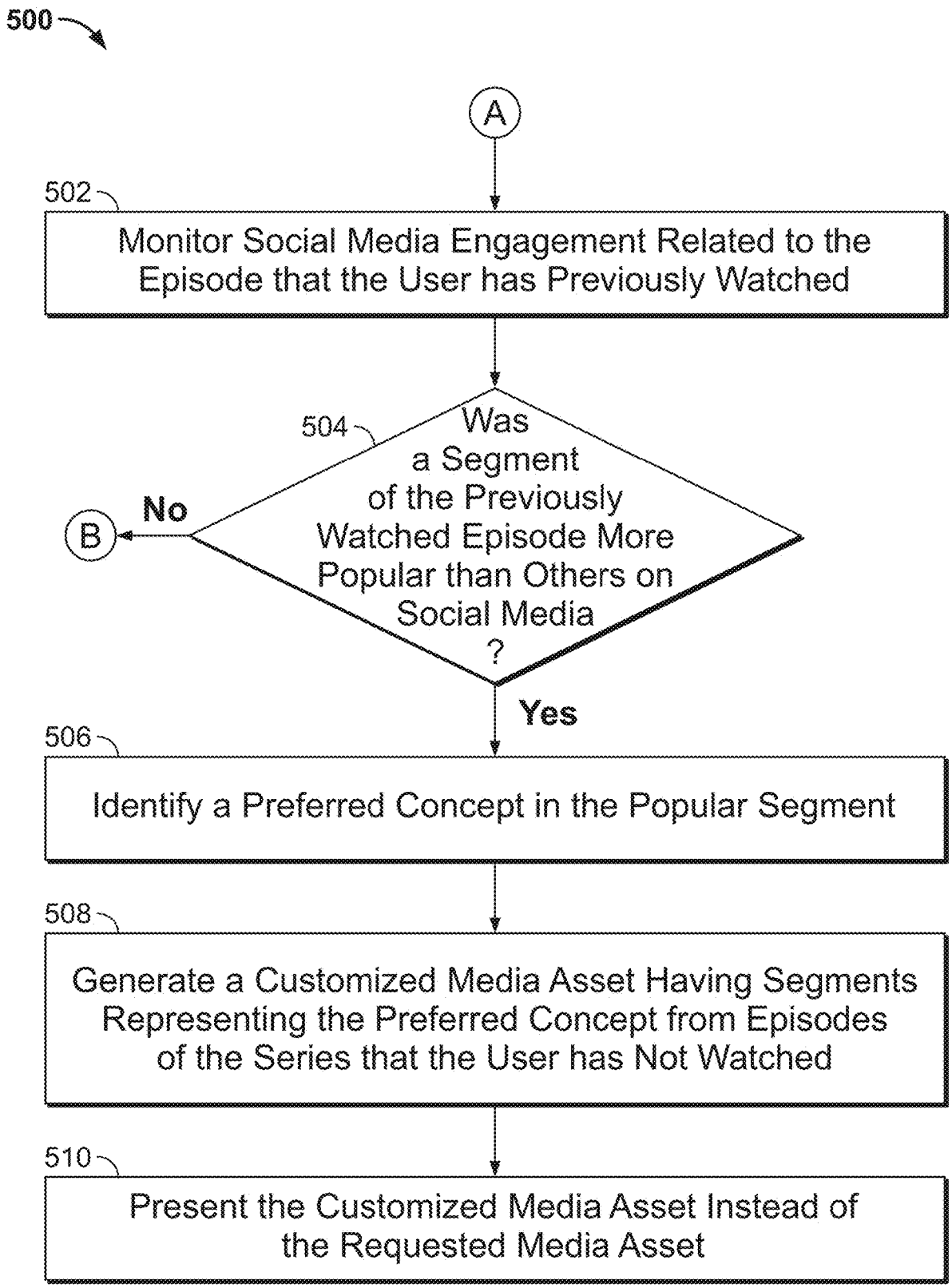
FIG. 5 is a flowchart of a detailed illustrative process for developing a media asset consumption profile, in accordance with some embodiments of this disclosure.

FIG. 5 is a flowchart for representing a process 500 for generating a customized media asset when the first user has not previously posted on social media about episodes that the first user has previously watched, in accordance with some embodiments of the disclosure. Process 500 may be implemented on control circuitry 1104. At 502, control circuitry 1104 monitors social media engagement related to the episode that the first user has previously watched. For example, when control circuitry 1104 determines that the first user has watched episode 1 of the series "Game of Thrones," control circuitry 1104 monitors discussion on social media networks related to the episode. In one embodiment, control circuitry 1104 can retrieve critical ratings or reviews related to the episode. At 504, control circuitry 1104 determines whether a segment of the previously watched episode was more popular than others. In some embodiments, a "popularity" field is updated with a score after an episode is available for public consumption. In particular, since the media provider cannot predict how popular a specific scene will be among viewers before the content is officially released, a "popularity" score for each of the scenes can be assigned based on audience feedback. For example, scenes of episode of Game of Thrones featuring the character "Ned Stark" can be determined to be very popular based on discussion by viewers on various social media platforms and/or critic reviews and articles. In such an embodiment, this information can be used to update the JSON file with a popularity score. In an embodiment, the popularity scores are used in the segment selection process when generating the customized media asset. In an embodiment, segments with no scores (or low scores) can be omitted when generating the customized media asset.

In one embodiment, control circuitry 1104 determines, based on the monitored social media engagement, whether particular scenes of the previously watched episode were more frequently discussed on social media networks. In another embodiment, control circuitry 1104 analyzes the retrieved critical reviews and ratings to determine whether a particular segment of the previously watched episode was discussed more frequently than others.

In response to determining that a segment of the previously watched episode was more popular than others (YES at 504), process 500 proceeds to 506 where the popular segment is analyzed to identify a preferred concept from the popular segment. In one embodiment, a sentiment analysis can be performed on the discussion related to the identified popular segment to identify specific characteristics (e.g., genre, storylines, characters, etc.) being discussed with greater frequency. For example, control circuitry 1104 can determine the phrase "Ned Stark" was discussed with greater frequency than other phrases related to the episode of "Game of Thrones" and identify that particular storyline related to the character "Ned Stark" as the preferred concept.

At 508, control circuitry 1104 generates a customized media asset which includes scenes from episodes not previously watched by the first user. More particularly, the customized media asset includes scenes which represent the identified preferred concept. For example, when control circuitry 1104 identifies the storyline featuring "Ned Stark" as the preferred concept, scenes developing the storyline related to the character "Ned Stark" are included in the customized media asset. At 510, the customized media asset is presented instead of the requested media asset. For example, customized media asset 112 is presented to the first user instead of the requested media asset (e.g., a first episode of the series "Game of Thrones"). If, on the other hand, control circuitry 1104 determines that a segment of the previously watched episode was not more popular than others, the process proceeds to step 410 discussed above.

Certain media providers offer various premium channels (e.g., HBO, Showtime, etc.) to which a first user can subscribe to individually either on a temporary basis or permanent basis. In such embodiments, the media provider can make use of the first user's media asset viewing history for channels that the first user is subscribed to in order to incentivize the first user to permanently subscribe to the premium channels. In some embodiments, the media provider can develop the media consumption profile for the first user based on the viewing habits of social connections of the first user on one or more social media networks. In such an embodiment, the media provider already has a media consumption profile for the user. For example, viewing data might already have been collected by the media provider and being used to generate recommendations for channels that the user is permanently subscribed to. In an embodiment, the user's media consumption profile is utilized to recommend a specific show to watch the customized media asset for. In another embodiment, the user's media consumption profile is used to decide on which plot (e.g., drama) and/or actor to generate a customized media asset for. In some instances, the service might allow the user to watch a plurality of episodes and then offer the customized media asset to help the user decide on subscribing permanently.

Figure 6:
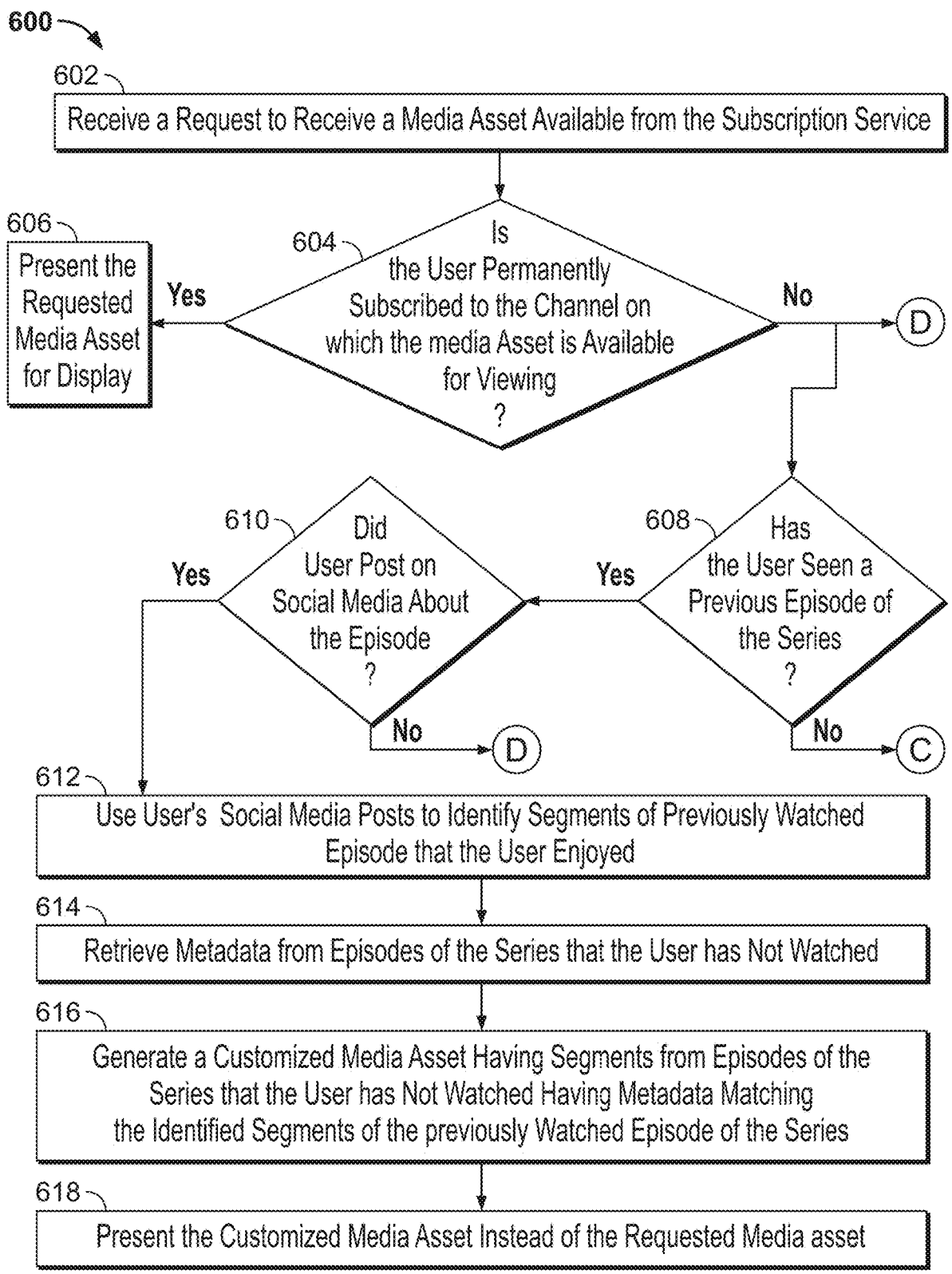
FIG. 6 is a flowchart of a detailed illustrative process for developing a media asset consumption profile, in accordance with some embodiments of this disclosure.

FIG. 6 is a flowchart for representing a process 600 for developing a media asset consumption profile, in accordance with some embodiments of the disclosure. Process 600 may be implemented on control circuitry 1104. At 602, control circuitry 1104 receives a request to receive a media asset available from the subscription service. For example, control circuitry 1104 receives a selection of the show "Game of Thrones" from the channel "HBO" offered by the media provider.

At 604, control circuitry 1104 determines whether the first user is a permanent subscriber to the channel on which the requested media asset is available for viewing. For example, control circuitry 1104 determines whether the first user is permanently subscribed to the channel "HBO." In response to determining that the first user is permanently subscribed to the channel (YES at 604), the requested media asset is presented. If, on the other hand, it is determined that the first user is not permanently subscribed to the channel (NO at 604), the process proceeds to 608 and 802 (as discussed in greater detail below in connection with FIG. 8). At 608, control circuitry 1104 determines whether the first user has seen a previous episode the series to which the requested media asset belongs to. For example, upon selection of the show "Game of Thrones," control circuitry 1104 determines whether the first user has seen a previous episode of the series. In response to determining that the first user has not seen a previous episode of the series (NO at 608), process 600 moves to 702 which will be discussed in greater detail below in connection with the discussion of FIG. 7.

If, on the other hand, control circuitry 1104 determines that the first user has previously seen an episode of the requested series (NO at 608), process 600 proceeds to 610. At 610, control circuitry 1104 determines whether the first user posted on social media about the previously viewing episode of the requested series. In response to determining that the first user has not posted on social media about the previously watched episode (NO at 610), process 600 proceeds to 802, which will be discussed in greater detail below in connection with FIG. 8. If, on the other hand, control circuitry 1104 determines that the first user has posted on social media about the previously watched episode (YES at 610), process 600 proceeds to 612. At 612, control circuitry 1104 uses the social media activity of the first user to identify segments of previously watched episodes that the first user enjoyed. For example, if the first user remarked on a social media network stating, "Why would they do that to Ned Stark?!", control circuitry 1104 can determine that the first user has enjoyed that particular storyline from the first season of the show "Game of Thrones." Process 600 proceeds to 614 where metadata for each of the future episodes that the first user has not previously seen is retrieved. For example, content metadata is retrieved from the HLS master playlist, in accordance with one embodiment.

At 616, control circuitry 1104 generates a customized media asset which includes segments from episodes of the series that the first user has previously not watched. More particularly, the customized media asset includes segments having metadata that match metadata from the episodes that the first user has previously watched. For example, when control circuitry 1104 determines that the first user has shown interest in the storyline featuring the character "Ned Stark," scenes from additional episodes of the show "Game of Thrones" that continue the storyline of the character "Ned Stark" are retrieved to generate the customized media asset. At 618, the customized media asset 112 is presented to the first user instead of the requested media asset (e.g., a first episode of the series "Game of Thrones").

Figure 7:
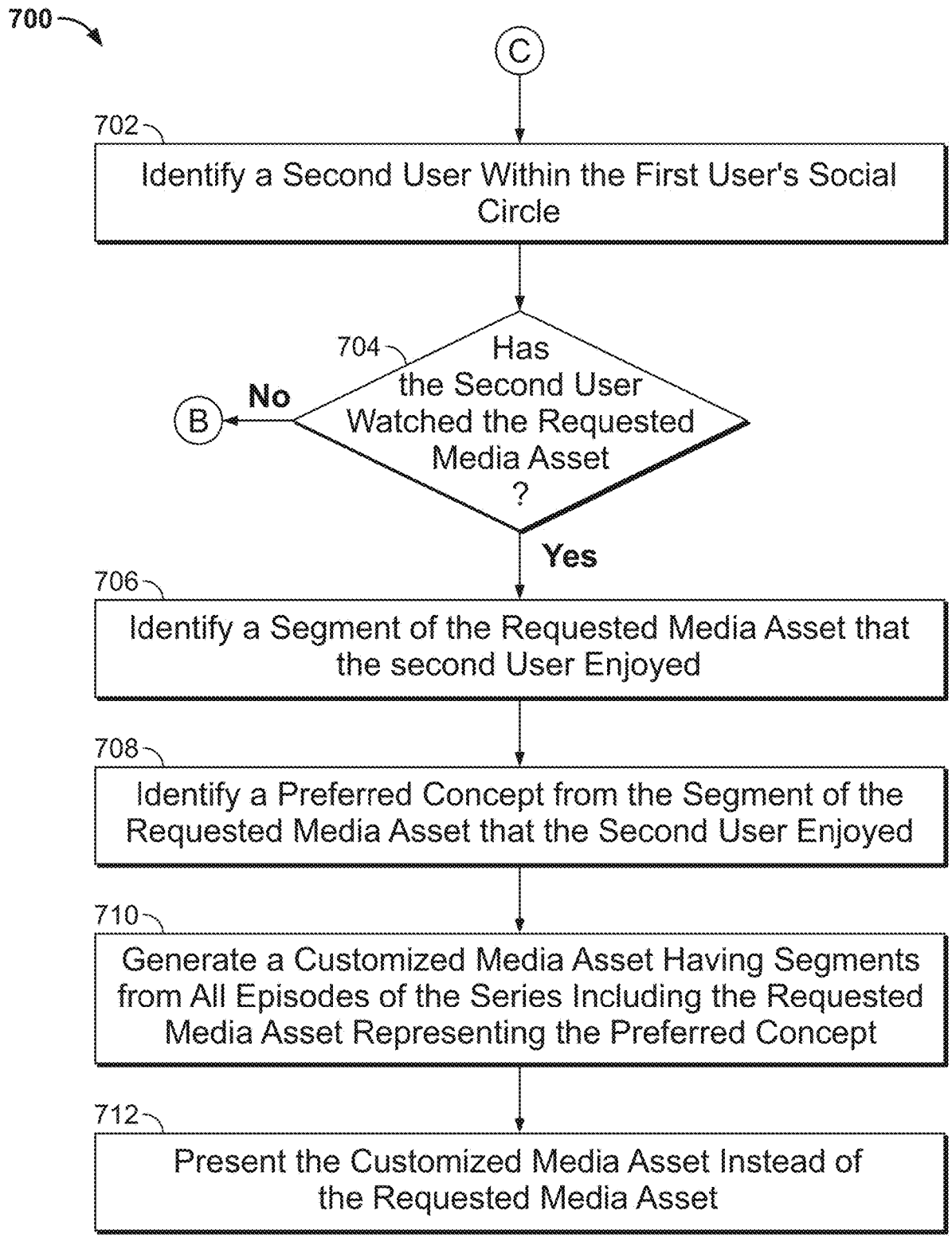
FIG. 7 is a flowchart of a detailed illustrative process for developing a media asset consumption profile, in accordance with some embodiments of this disclosure.

FIG. 7 is a flowchart for representing a process 700 for developing a media asset consumption profile, in accordance with some embodiments of the disclosure. Process 700 may be implemented on control circuitry 1104. At 702, control circuitry 1104 identifies a second user within a social circle of the first user. In one embodiment, control circuitry 1104 retrieves a list of social connections of the first user from a social media network database and identifies a second user whose media consumption profile matches that of the first user. At 704, control circuitry 1104 determines whether the second user has watched the requested media asset. For example, control circuitry 1104 can determine whether the second user has watched the requested episode of the show "Game of Thrones." In response to determining that the second user has not watched the requested media asset (NO at 704), process 700 proceeds to step 410 where control circuitry 1104 uses the media asset consumption profile of the first user to generate the customized media asset.

If, on the other hand, control circuitry 1104 determines that the second user has watched the requested media asset (YES at 704), process 700 proceeds to 706. At 706, control circuitry 1104 identifies a segment of the requested media asset that the second user enjoyed. For example, control circuitry 1104 can determine that the second user shared a particular scene on their social media from the requested media asset. Control circuitry 1104 can then identify that scene as the segment of the requested media asset that the second user enjoyed.

At 708, control circuitry 1104 identifies a preferred concept from the segment of the requested media asset that the second user enjoyed. In one embodiment, control circuitry 1104 can identify specific characteristics (e.g., genre, storylines, characters, etc.) of the identified segment. For example, control circuitry 1104 can determine that the second user added the phrase "Ned Stark" when sharing the scene from the requested episode on their social media and identify that particular storyline related to the character "Ned Stark" as the preferred concept.

At 710, control circuitry 1104 generates a customized media asset which includes scenes from episodes that represent the preferred concept. For example, when control circuitry 1104 identifies the storyline featuring "Ned Stark" as the preferred concept, scenes developing the storyline related to the character "Ned Stark" are included in the customized media asset. At 712, the customized media asset is presented instead of the requested media asset. For example, customized media asset 112 is presented to the first user instead of the requested media asset (e.g., a first episode of the series "Game of Thrones").

Figure 8:
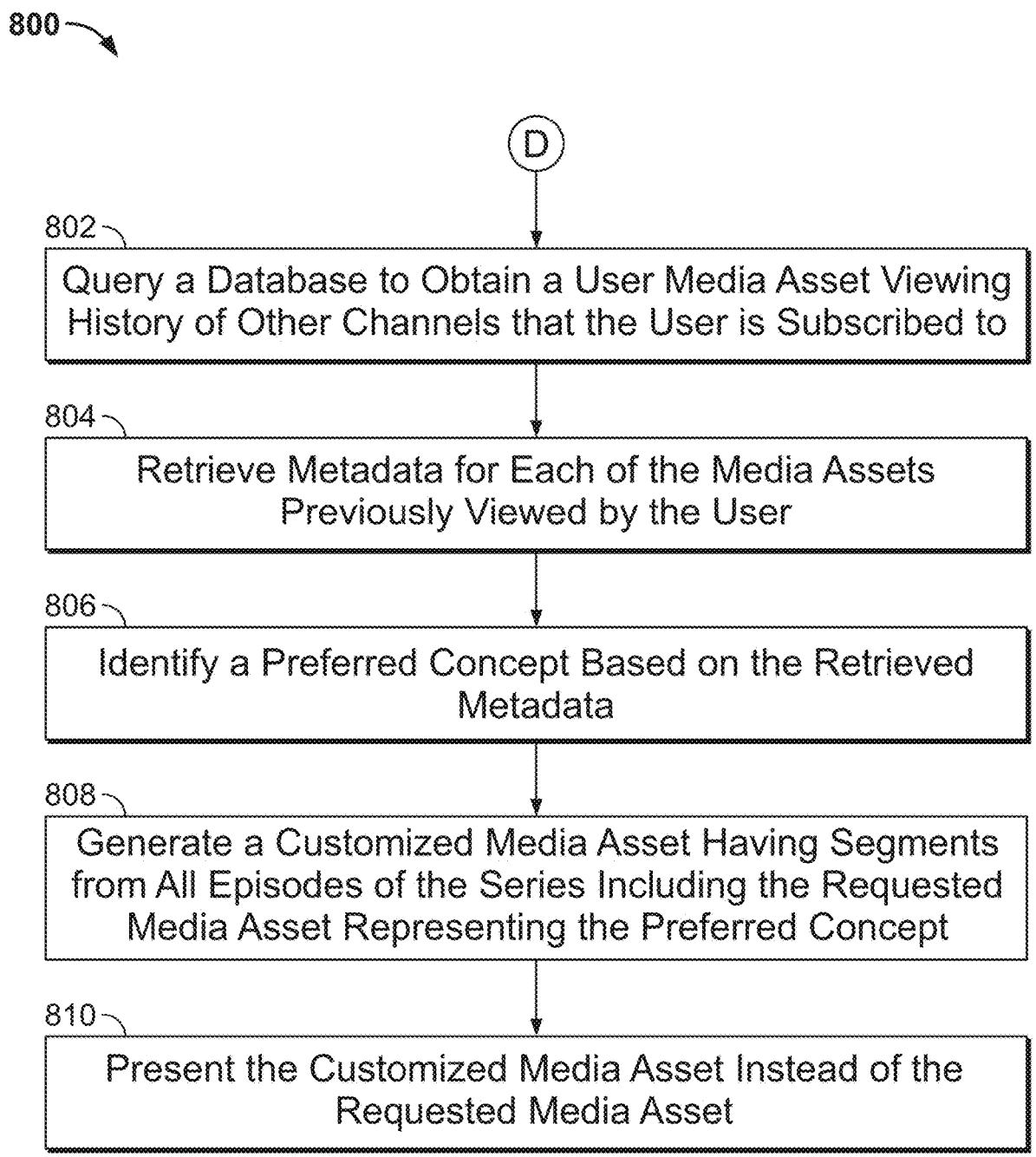
FIG. 8 is a flowchart of a detailed illustrative process for developing a media asset consumption profile, in accordance with some embodiments of this disclosure.

FIG. 8 is a flowchart for representing a process 800 for developing a media asset consumption profile, in accordance with some embodiments of the disclosure. Process 800 may be implemented on control circuitry 1104. At 802, control circuitry 1104 queries a database to obtain a media asset viewing history from other channels offered by the media provider to which the first user is permanently subscribed to. At 804, control circuitry 1104 retrieved metadata for each of the media assets previously viewed by the first user. For example, content metadata is retrieved from the HLS master playlist corresponding to each of the media assets previously viewed by the first user, in accordance with one embodiment.

At 806, control circuitry 1104 identifies a preferred concept for the first user based on the retrieved metadata. In one embodiment, control circuitry 1104 can determine a frequency with which the first user watches media assets belonging to a particular genre. In another embodiment, control circuitry 1104 can determine a frequency with which the first user watches media assets featuring a particular actor. Control circuitry 1104 can then identify the preferred concept based on the determined frequency. For example, in response to determining that the first user has frequently watched media assets which feature the actor "Charles Dance," control circuitry 1104 can identify the actor as the preferred concept.

At 808, control circuitry 1104 generates a customized media asset which includes scenes from episodes that represent the preferred concept. For example, control circuitry 1104 generates a customized media asset which includes scenes featuring the actor "Charles Dance." At 810, the customized media asset is presented instead of the requested media asset. For example, customized media asset 112 is presented to the first user instead of the requested media asset (e.g., a first episode of the series "Game of Thrones").

Figure 9:
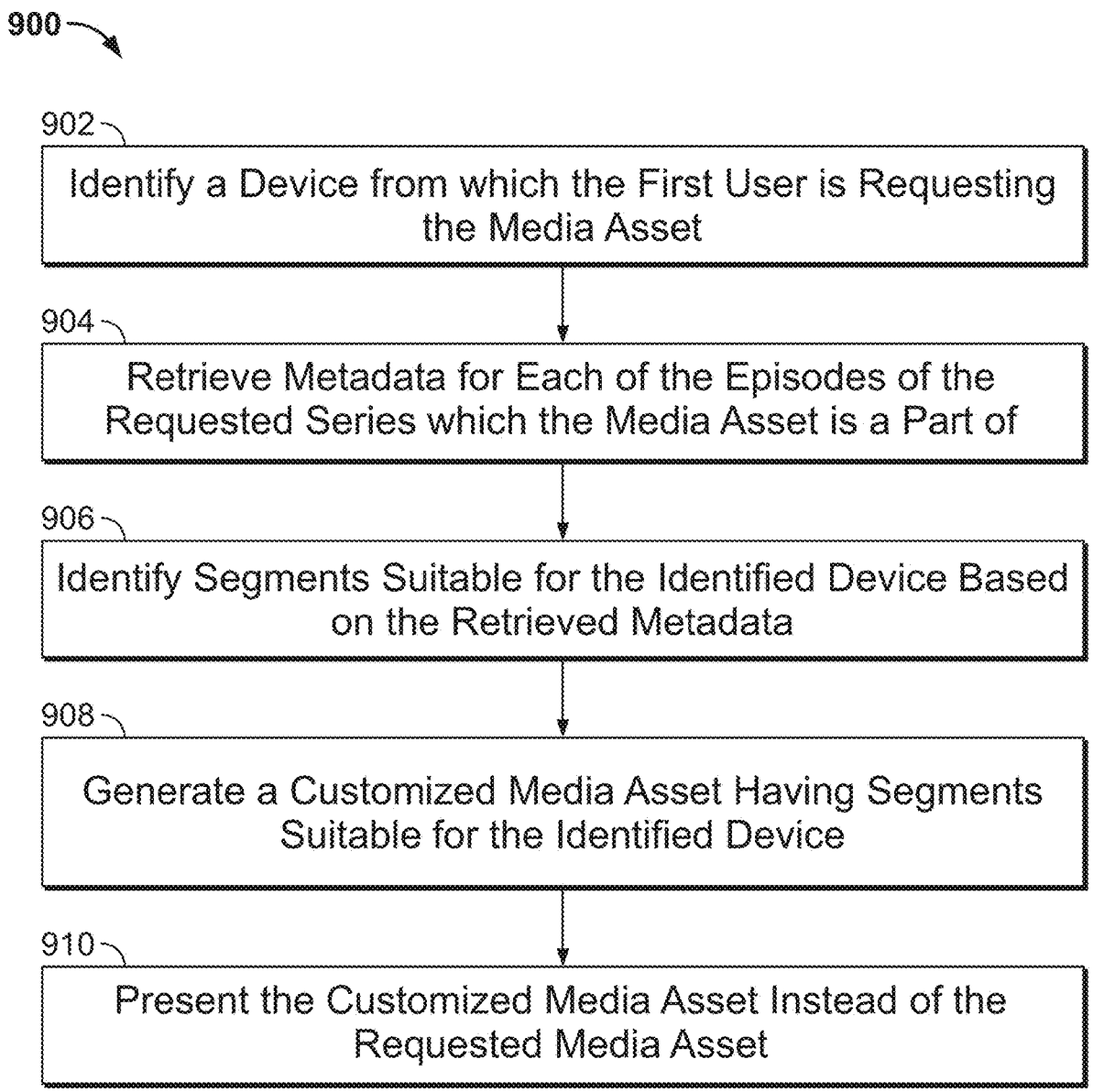
FIG. 9 is a flowchart of a detailed illustrative process for generating a customized media asset, in accordance with some embodiments of this disclosure.

In an embodiment, the customized media asset is generated based on one or more of a device type, network type, or a location from which the request for the media asset was received. FIG. 9 is a flowchart for representing a process 900 for generating a customized media asset based on a device type, in accordance with some embodiments of the disclosure. Process 900 may be implemented on control circuitry 1104. At 902, control circuitry 1104 identifies a device from which the first user is requesting the media asset. For example, when the first user selects the media asset, control circuitry 1104 determines the screen size of device on which the media asset will be viewed. In one embodiment, control circuitry 1104 can determine the device specifications by, for instance, reviewing the request received at a server of the media provider which includes such information (e.g., a type of web browser or application used to request the media asset).

At 904, control circuitry 1104 retrieves metadata for each of the episodes of the series which the requested media asset belongs to. For example, when the first user selects the show "Game of Thrones," control circuitry 1104 retrieves metadata for all episodes of the series "Game of Thrones." At 906, control circuitry 1104 identifies segments suitable for the identified device based on the retrieved metadata. In an embodiment, when control circuitry 1104 determines that the first user is requesting the media asset for viewing on a mobile device having a small screen size, control circuitry 1104 identifies segments that are best suited for viewing on a smaller screen size. For example, control circuitry 1104 identifies segments that feature a lot of dialogue between characters, in order to limit the impact of the smaller screen size.

At 908, control circuitry 1104 generates the customized media asset having segments suitable for the identified device. For example, control circuitry 1104 removes segments that are best viewed on a larger screen (e.g., battle scenes) while prioritizing segments that are less impacted by viewing on a smaller screen size (e.g., segments featuring a lot of dialogue between characters). At 910, the generated customized media asset is presented to the first user for viewing instead of the requested media asset.

Figure 10:
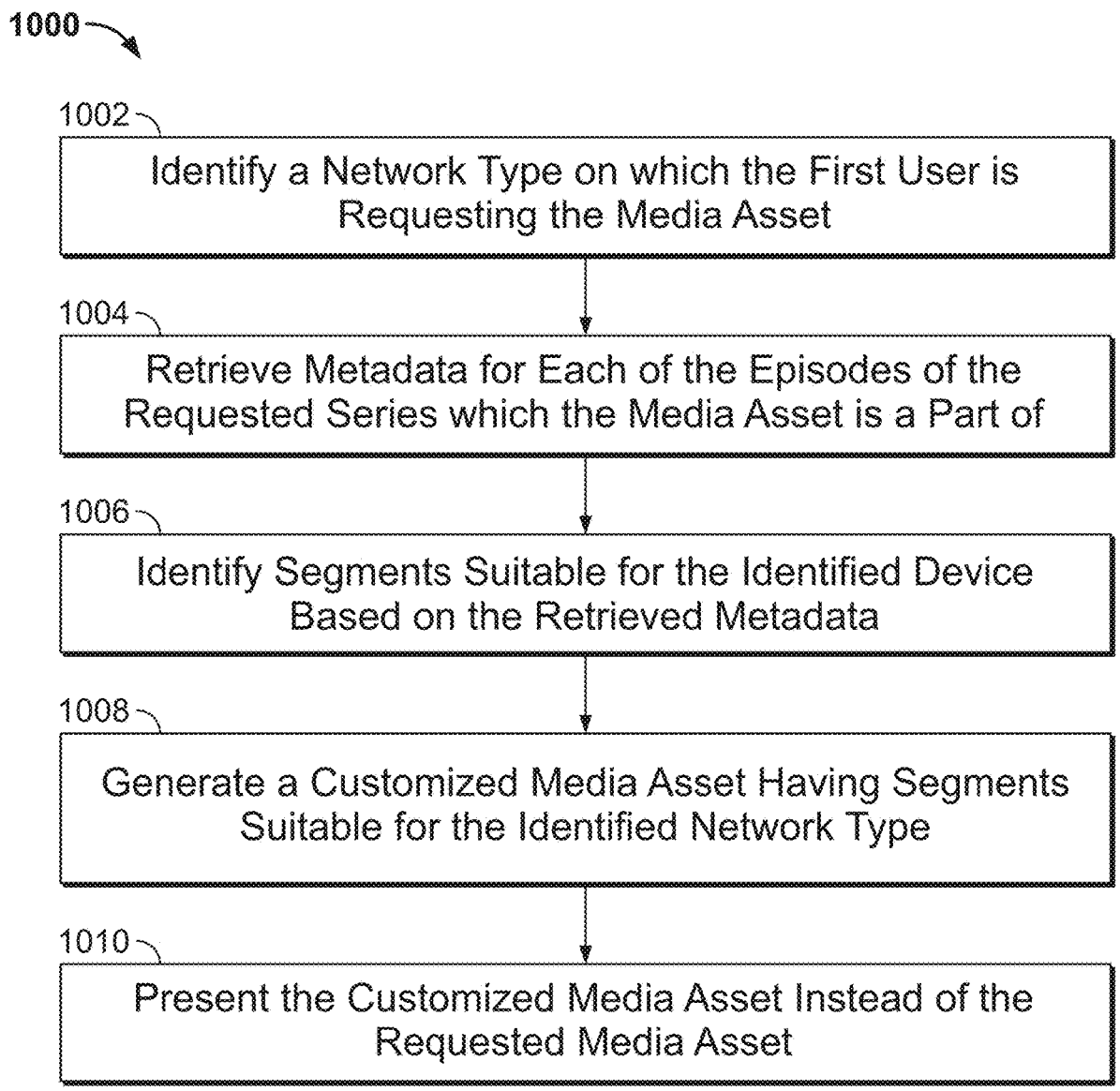
FIG. 10 is a flowchart of a detailed illustrative process for generating a customized media asset, in accordance with some embodiments of this disclosure.

FIG. 10 is a flowchart for representing a process 1000 for generating a customized media asset based on a network type, in accordance with some embodiments of the disclosure. Process 1000 may be implemented on control circuitry 1104. At 1002, control circuitry 1104 identifies a network type being used by the first user to request the media asset. For example, when the first user selects the media asset, control circuitry 1104 determines the network speed (e.g., 4G, LTE, WIFI, etc.) of the device on which the media asset will be viewed. In one embodiment, control circuitry 1104 can determine the network specifications by, for instance, reviewing the request received at a server of the media provider which includes such information (e.g., a type of web browser or application used to request the media asset).

At 1004, control circuitry 1104 retrieves metadata for each of the episodes of the series which the requested media asset belongs to. For example, when the first user selects the show "Game of Thrones," control circuitry 1104 retrieves metadata for all episodes of the series "Game of Thrones." At 1006, control circuitry 1104 identifies segments suitable for the identified network type based on the retrieved metadata. For example, when control circuitry 1104 determines that the network connection is likely to be slow and result in a lower resolution video being transmitted to the first user's device, control circuitry 1104 generates the customized media asset to include segments which are not impacted by a lower resolution (e.g., scenes featuring a lot of dialogue with characters being stationary) and limits the segments which are significantly impacted by the lower resolution (e.g., action scenes).

At 1008, control circuitry 1104 generates the customized media asset having segments suitable for the identified device. For example, control circuitry 1104 removes segments that are best viewed on a higher network speed (e.g., battle scenes) while prioritizing segments that are less impacted by viewing on a lower network speed (e.g., segments featuring a lot of dialogue between characters). At 1010, the generated customized media asset is presented to the first user for viewing instead of the requested media asset.

It is contemplated that the various processes as described in relation to FIGS. 2 and 4-10 may be used with any other embodiment of this disclosure. In addition, the descriptions in relation to the processes of FIGS. 2 and 4-10 may be done in alternative orders or in parallel to further the purposes of this disclosure. For example, conditional statements and logical evaluations may be performed in any order or in parallel or simultaneously to reduce latency or increase the performance (e.g., speed, efficiency, etc.) of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 2 and 4-10 may be implemented on a combination of suitably configured software and hardware (e.g., a non-transitory computer readable medium including instructions for executing steps of the above processes), and that any of the devices or equipment discussed in relation to FIGS. 2-10 could be used to implement one or more portions of the various processes.

Figure 11:
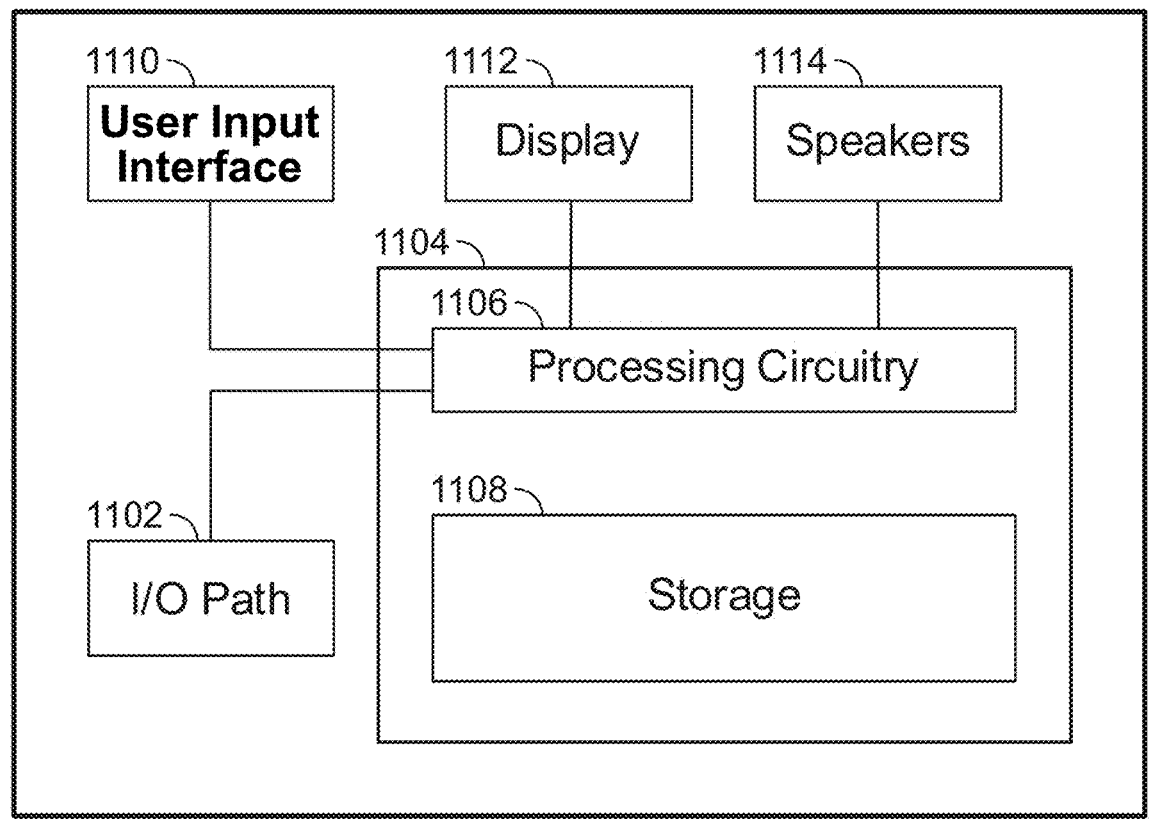
FIG. 11 is a block diagram of an illustrative user equipment device, in accordance with some embodiments of the disclosure.

FIG. 11 depicts a generalized embodiment of an illustrative device (e.g., user equipment device 102) that presents the customized media asset. User equipment device 1100 may be any of a plurality of user devices such as a smartphone, a tablet, personal computer, set-top box, etc. (discussed further below with respect to FIG. 12). User equipment device 1100 may receive the media asset data via input/output (hereinafter "I/O") path 1102. I/O path 1102 may provide the media asset (e.g., on-demand programming, Internet content item, content item available over LAN or WAN, and the like) and data to control circuitry 1104, which includes processing circuitry 1106 and storage 1108. Control circuitry 1104 may be used to send and receive commands, requests, and other suitable data using I/O path 1102. I/O path 1102 may connect control circuitry 1104 (and specifically processing circuitry 1106) to one or more communications paths (described below in relation to FIG. 12). I/O functions may be provided by one or more of these communications paths but are shown as a single path in FIG. 11 to avoid overcomplicating the drawing.

Control circuitry 1104 may be based on any suitable processing circuitry such as processing circuitry 1106. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 1104 executes instructions for an application stored in memory (e.g., memory 1108). Specifically, control circuitry 1104 may be instructed by a media application to perform the functions discussed above and below. For example, the media application may provide instructions to control circuitry 1104 to generate the customized media asset instead of the requested media asset. Moreover, the media application may also collect user preference information and generate the customized media asset. In some implementations, any action performed by control circuitry 1104 may be based on instructions received from the media application.

Control circuitry 1104 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 1108) may also be provided. Control circuitry 1104 may also include scaler circuitry for upconverting and downconverting content item into the preferred output format of user equipment device 1100, and converter circuitry for converting between digital and analog signals. The tuning and encoding circuitry may be used by user equipment device 1100 to receive, play, and buffer content item. The circuitry described herein, including for example, the tuning, audio generating, encoding, decoding, encrypting, decrypting, scaler, and analog/digital circuitry, may be implemented using software running on one or more general purpose or specialized processors. If storage 1108 is provided as a separate device from user equipment device 1100, the tuning and encoding circuitry may be associated with storage 1108.

Storage 1108 may be any device for storing electronic data, such as random-access memory, solid state devices, quantum storage devices, hard disk drives, non-volatile memory or any other suitable fixed or removable storage devices, and/or any combination of the same. Control circuitry 1104 may allocate portions of storage 1108 for various purposes such as caching application instructions, recording media assets, storing portions of a media asset, buffering segments of media, etc. As described herein, storage 1108 may be used to store one or more LUTs storing a number of MAC addresses associated with a plurality of user equipment devices and their corresponding profile information.

A user may send instructions to control circuitry 1104 using user input interface 210. User input interface 1110 may be any suitable user input interface, such as a remote control as shown in FIG. 1, mouse, trackball, keypad, keyboard, touch screen, touchpad, stylus input, joystick, voice recognition interface, or other user input interfaces. Instructions to control circuitry 1104 may be transmitted through I/O path 1102, that could consist of a video tracking and detection mechanism, Internet of Things (IoT) and home automation triggers, emergency alert systems, and software or hardware communication pipelines and/or notification centers.

Display 1112 may be provided as a stand-alone device or integrated with other elements of each one of user equipment device 1100. For example, display 1112 may be a touchscreen or touch-sensitive display, a projector, or a casting device. In such circumstances, user input interface 1110 may be integrated with or combined with display 1112. Display 1112 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 1112. In some embodiments, the graphics processing circuitry may be external to processing circuitry 1106 (e.g., as a graphics processing card that communicates with processing circuitry 1106 via I/O path 1102) or may be internal to processing circuitry 1106 or control circuitry 1104 (e.g., on a same silicone die as control circuitry 1104 or processing circuitry 206). In some embodiments, the graphics processing circuitry may be used to receive, display, and play the media asset.

Speakers 1114 may be provided as integrated with other elements of user equipment device 1100 or may be stand-alone units. The audio component of videos and other media asset displayed on display 1112 may be played through speakers 1114. In some embodiments, the audio may be distributed to a receiver (not shown), which processes and outputs the audio via speakers 1114. The speakers 1114 may be part of, but not limited to, a home automation system.

The media application may be implemented using any suitable architecture. For example, it may be a stand-alone application wholly implemented on user equipment device 1100. The user interface application and/or any instructions for performing any of the embodiments discussed herein may be encoded on computer-readable media. Computer-readable media includes any media capable of storing data.

Figure 12:
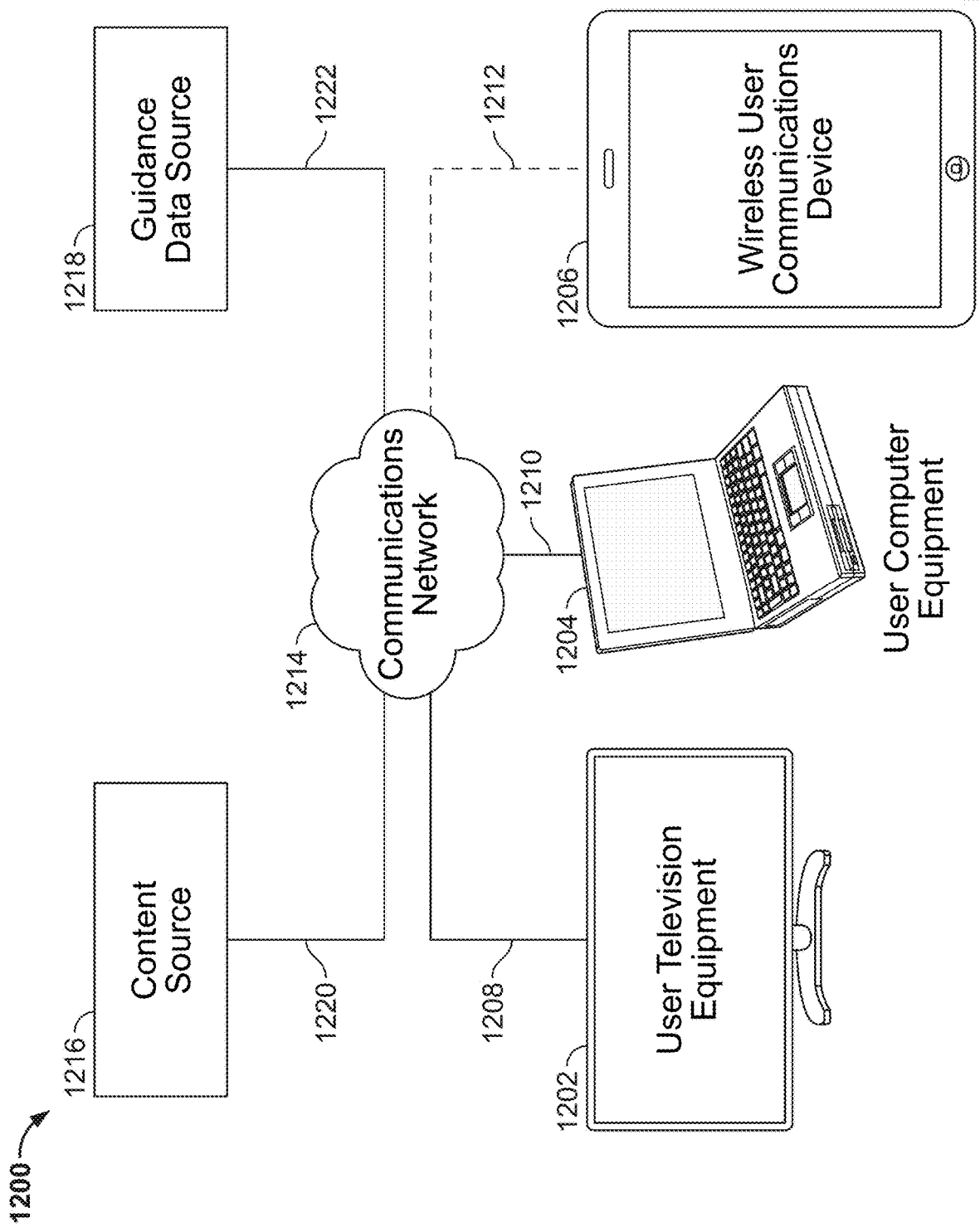
FIG. 12 is a block diagram of an illustrative media system, in accordance with some embodiments of the disclosure.

FIG. 12 depicts an exemplary media system in accordance with some embodiments of the disclosure in which user equipment device 102 and user equipment device 1100 can be implemented in system 1200 of FIG. 12 as user television equipment 1202, user computer equipment 1204, wireless user communications device 1206, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 1202 may include a set-top box, an integrated receiver decoder (IRD) for handling satellite television, a television set, a digital storage device, or other user television equipment. One or more of these devices may be integrated to be a single device, if desired. User computer equipment 1204 may include a PC, a laptop, a streaming content item aggregator, a PC media center, or other user computer equipment. It may include devices like digital assistant, smart speakers, and/or home automation. Wireless user communications device 1206 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 1200, there is typically more than one of each type of user equipment but only one of each is shown in FIG. 12 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 1214. Namely, user television equipment 1202, user computer equipment 1204, and wireless user communications device 1206 are coupled to communications network 1214 via communications paths 1208, 1210, and 1212, respectively. Communications network 1214 is used by the user equipment to obtain the customized media asset. Communications network 1214 may be one or more networks including the Internet, a mobile phone network, ad-hoc network, a Local Area network (LAN), or other types of communications network or combination of communications networks. Paths 1208, 1210, and 1212 may separately or together include one or more communications paths, including any suitable wireless communications path. Paths 1208 and 1210 are drawn as solid lines to indicate they are wireless paths and path 1212 is drawn as dotted line to indicate it is a wired path. Communications with the user equipment may be provided by one or more of these communications paths but are shown as a single path in FIG. 12 to avoid overcomplicating the drawing. The user equipment devices may communicate with each other directly through an indirect path via communications network 1214.

System 1200 includes content item source 1216 and guidance data source 1218 coupled to communications network 1214 via communications paths 1220 and 1222, respectively. Paths 1220 and 1222 may include any of the communications paths described above in connection with paths 1208, 1210, and 1212. Communications with the content item source 1216 and guidance data source 1218 may be exchanged over one or more communications paths but are shown as a single path in FIG. 12 to avoid overcomplicating the drawing. In addition, there may be more than one of each of content item source 1216 and guidance data source 318, but only one of each is shown in FIG. 12 to avoid overcomplicating the drawing. In some embodiments, content item source 1216 and guidance data source 1218 are integrated as one source device. Although communications between sources 1216 and 1218 with user equipment 1202, 1204, and 1206 are shown as through communications network 1214, in some embodiments, sources 1216 and 1218 may communicate directly with user equipment devices 1202, 1204, and 1206 via communications paths (not shown) such as those described above in connection with paths 1208, 1210, and 1212.

Content item source 1216 may include one or more types of media distribution equipment such as a media server, cable system headend, satellite distribution facility, intermediate distribution facilities and/or servers, Internet providers, on-demand media servers, and other media providers. Content item source 1216 may be the originator of media content item or may not be the originator of media content item. Content item source 1216 may also include a remote media server used to store different types of media content item (including a media asset selected by a user), in a location remote from any of the user equipment. Systems and methods for providing remotely stored media to user equipment are discussed in greater detail in connection with Ellis et al., U.S. patent application ser. No. 09/332,244, filed Jun. 11, 1999, which is hereby incorporated by reference herein in its entirety.

Guidance data source 1218 may provide media guidance data, such as the content item information discussed above in relation to FIG. 1 or any other data related to a media asset or profile of a user. Guidance data may be provided to the user equipment using any suitable approach such as via a data feed or by querying a database of guidance data source 1218. For example, control circuitry 1104 may transmit a query to a database of guidance data source 1218 comprising a command to retrieve metadata and an identifier uniquely representing a media asset. In response to transmitting the query, control circuitry 1104 may receive a response from the database comprising metadata for the media asset uniquely represented by the identifier.

System 1200 is intended to illustrate a number of approaches, or network configurations, by which user equipment devices and sources of media content item and guidance data may communicate with each other for the purpose of accessing media and data related to the media. The configuration of the devices and paths in system 1200 may change without departing from the scope of the present disclosure.

In some cases, media providers can offer potential subscribers the option to try their service for a fixed period instead of offering one single free episode. However, in such aspects, users are overwhelmed with available media asset options for viewing and often merely browse the available media assets before letting the trial subscription lapse. Methods and systems are also provided herein for providing a curated selection of media assets to a potential subscriber during the trial period. In particular, control circuitry 1104 can identify media assets that are likely to be of maximum interest to the potential subscriber based on the media asset consumption profile of the potential subscriber. For example, if the potential subscriber primarily watches media assets in the "Comedy" genre, providing them with media assets in the "Drama" or "Action" genres will discourage the potential subscriber from becoming a potential subscriber. Control circuitry 1104 instead only presents media assets in the "Comedy" genre to the potential subscriber during the trial period in order to increase engagement with the potential subscriber.

In some embodiments, control circuitry 1104 can also apply aggressive personalization when determining the selection of media assets offered to the potential subscriber during the trial period. For example, control circuitry 1104 can determine a geographic location of the potential subscriber (e.g., India) and present primarily Hindi-language media assets to the potential subscriber during the trial period. By limiting the available media asset options for selection, potential subscribers are more likely to begin watching media assets instead of merely browsing through the selection.

The processes described above are intended to be illustrative and not limiting. One skilled in the art would appreciate that the steps of the processes discussed herein may be related causally (i.e., in response), omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, comprising:
  receiving a selection of an episode of a series, via a user interface;
  identifying, based on a user profile, a plurality of episodes of the series indicated as unconsumed;
  accessing a review of the series or a comment about the series submitted in association with the user profile;
  selecting a plurality of clips from the plurality of episodes of the series indicated by the user profile as unconsumed based on the review of the series or the comment about the series submitted in association with the user profile; and
  generating for display a custom media asset assembled from the plurality of clips.

2. The method of claim 1, wherein the accessing the review of the series or the comment about the series submitted in association with the user profile further comprises accessing a social media database that stores the review of the series or the comment about the series.

3. The method of claim 1, wherein the user profile is linked to a social media user profile of a social media service.

4. The method of claim 1, further comprising:
  identifying, based on the user profile, a plurality of episodes of the series indicated as consumed;
  identifying a preferred concept in the plurality of consumed episodes of the series;
  wherein the selecting the plurality of clips from the plurality of episodes of the series indicated by the user profile as unconsumed is further based on the preferred concept.

5. The method of claim 1, wherein the selecting the plurality of clips is further based on clip popularity data.

6. The method of claim 1, wherein the selecting the plurality of clips is further based on at least one of: network type, device type, or location data.

7. The method of claim 1, further comprising:
  identifying, based on the user profile, a subscription level;
  wherein the selecting the plurality of clips from the plurality of episodes of the series indicated by the user profile as unconsumed is based on which episodes of the series the subscription level provides access to.

8. The method of claim 1, further comprising:
  receiving a second selection, via the user interface, to play the custom media asset.

9. The method of claim 1, further comprising:
  identifying, based on the user profile, a plurality of episodes of a different series indicated as consumed by the user profile;
  accessing a review of the different series or a comment about the different series submitted in association with the user profile;
  identifying, based on the plurality of consumed episodes of the different series and the review of the different series or the comment about the different series, a preferred concept; and
  selecting the plurality of clips from the plurality of episodes of the series indicated by the user profile as unconsumed further based on the preferred concept.

10. The method of claim 1, further comprising:
selecting a different plurality of clips from the selected episode of the series based on the review of the series or the comment about the series submitted in association with the user profile; and
generating for display the custom media asset assembled from the plurality of clips from the plurality of episodes of the series indicated by the user profile as unconsumed and the different plurality of clips from the selected episode of the series.

11. A system, comprising:
input/output circuitry configured to:
receive a selection of an episode of a series, via a user interface;
control circuitry configured to:
identify, based on a user profile, a plurality of episodes of the series indicated as unconsumed;
access a review of the series or a comment about the series submitted in association with the user profile;
select a plurality of clips from the plurality of episodes of the series indicated by the user profile as unconsumed based on the review of the series or the comment about the series submitted in association with the user profile; and
wherein the input/output circuitry is further configured to: generate for display a custom media asset assembled from the plurality of clips.

12. The system of claim 11, wherein the control circuitry is further configured to access the review of the series or the comment about the series submitted in association with the user profile further comprises accessing a social media database that stores the review of the series or the comment about the series.

13. The system of claim 11, wherein the user profile is linked to a social media user profile of a social media service.

14. The system of claim 11, wherein the control circuitry is further configured to:
identify, based on the user profile, a plurality of episodes of the series indicated as consumed;
identify a preferred concept in the plurality of consumed episodes of the series; and
wherein the control circuitry is further configured to select the plurality of clips further based on the preferred concept.

15. The system of claim 11, wherein the control circuitry is configured to select the plurality of clips further based on clip popularity data.

16. The system of claim 11, wherein the control circuitry is configured to select the plurality of clips further based on at least one of: network type, device type, or location data.

17. The system of claim 11, wherein the control circuitry is further configured to:
identify, based on the user profile, a subscription level;
wherein the control circuitry is further configured to select the plurality of clips from the plurality of episodes of the series indicated by the user profile as unconsumed based on which episodes of the series the subscription level provides access to.

18. The system of claim 11, wherein the input/output circuitry is further configured to:
receive a second selection, via the user interface, to play the custom media asset.

19. The system of claim 11, wherein the control circuitry is further configured to:
identify, based on the user profile, a plurality of episodes of a different series indicated as consumed by the user profile;
access a review of the different series or a comment about the different series submitted in association with the user profile;
identify, based on the plurality of consumed episodes of the different series and the review of the different series or the comment about the different series, a preferred concept; and
select the plurality of clips from the plurality of episodes of the series indicated by the user profile as unconsumed further based on the preferred concept.

20. The system of claim 11, wherein the control circuitry is further configured to:
select a different plurality of clips from the selected episode of the series based on the review of the series or the comment about the series submitted in association with the user profile; and
generate for display the custom media asset assembled from the plurality of clips from the plurality of episodes of the series indicated by the user profile as unconsumed and the different plurality of clips from the selected episode of the series.

* * * * *